3,389,994
PHOTOGRAPHIC LIGHT-SENSITIVE MATERIAL
Bernhard Piller, Basel, Switzerland, assignor to CIBA Limited, Basel, Switzerland, a Swiss company
No Drawing. Filed Dec. 15, 1964, Ser. No. 418,555
Claims priority, application Switzerland, Dec. 20, 1963, 15,703/63
8 Claims. (Cl. 96—84)

ABSTRACT OF THE DISCLOSURE

Photographic silver halide light-sensitive material containing a styryl dyestuff having at least one sulfonic acid group and that corresponds to the formula (1) $\quad A\text{—}R_1\text{—}CH\text{=}Py$ in which A represents an acylamino group bound to $R_1$ through its nitrogen atom, $R_1$ represents a benzene radical, and Py represents a radical of a 5-pyrazolone bound to the —CH= group in 4-position and to an aromatic ring in 1-position.

---

The present invention provides photographic light-sensitive material containing a styryl dyestuff having at least one sulfonic acid group and that corresponds to the formula (1) $\quad A\text{—}R_1\text{—}CH\text{=}Py$ in which A represents an acylamino group bound to $R_1$ through its nitrogen atom, $R_1$ represents a benzene radical, and Py represents a radical of a 5-pyrazolone bound to the —CH= group in 4-position and to an aromatic ring in 1-position.

The dyestuffs of the Formula 1 that contain sulfonic acid groups are new. They contain one or more than one sulfonic acid group, the said group or groups advantageously being present in the aromatic radical bound to the pyrazolone ring, particularly, radical of the benzene or naphthalene series. The benzene radical $R_1$ may contain further substituents in addition to the acylamino group A and the —CH= group, for example, halogen atoms such as chlorine, alkyl groups, for example, methyl groups or a sulfonic acid group. The acylamino group is advantageously in para-position to the —CH= group and consists of a radical of a primary ($H_2\text{—}N\text{—}R_1\text{—}$) or secondary amine, for example, an alkylamine

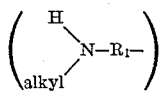

and a radical of a sulfonic acid or carboxylic acid. Examples that may be mentioned are the radicals of aromatic sulfonic acids, for example, benzene sulfonic acid or para-toluene sulfonic acid, aromatic carboxylic acids, for example, benzoic acid, para-chlorobenzoic acid and para-methylbenzoic acid and, in particular, the radicals of fatty acids. In the last-mentioned case, the radical A—$R_1$— advantageously corresponds to the formula (2) 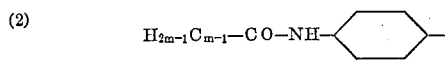

in which m represents an integer that is preferably not greater than 3, so that a formyl-, an acetyl- or a propionyl-amino group is present.

The radical Py in the Formula 1 may contain, for example, one or two pyrazolone rings. Such dyestuffs containing one or two pyrazolone rings correspond to the formula (3) $\quad (A\text{—}R_1\text{—}CH\text{=}Pz)_n R_2$ in which A represents an acylamino group bound to $R_1$ through its nitrogen atom, $R_1$ represents a benzene radical, Pz represents a 5-pyrazolone radical bound to the —CH= group in 4-position and to $R_2$ in 1-position, $R_2$ represents an aromatic radical and n represents 1 or preferably 2. In accordance with the invention the dyestuffs contain at least one sulfonic acid group, particularly in radical $R_2$. When the atomic grouping A—$R_1$—CH=Pz— occurs only once in the molecule (n=1, $R_2$ is advantageously an aryl radical containing sulfonic acid groups and having 1 or 2 six-membered rings, for example, a benzene, naphthalene or diphenyl radical containing one or two sulfonic acid groups. When the dyestuffs contain two atomic groups A—$R_1$—CH=Pz— it is generally advantageous for $R_2$ to be composed of two aryl radicals advantageously containing sulfonic acid groups, each radical having at least one six-membered ring and which are joined together either directly or through a bridge member. Dyestuffs of the kind defined correspond to the formula (4) $\quad A\text{—}R_1\text{—}CH\text{=}Pz\text{—}R_3\text{—}X\text{—}R_3{'}\text{—}Pz{'}\text{=}HC\text{—}R_1{'}\text{—}A'$ in which A and A' each represents an acylamino group bound to $R_1$ and $R_1'$ respectively through the nitrogen atom, $R_1$ and $R_1'$ each represents a benzene radical, Pz and Pz' each represents a radical of a 5-pyrazolone bound to the —CH= group in 4-position and to $R_3$ and $R_3'$ in 1-position, $R_3$ and $R_3'$ represent aromatic radicals, preferably benzene radicals and X represents a direct linkage or a bridge member, there being at least one sulfonic acid group present in the dyestuff molecule, preferably in at least one of the radicals $R_3$ and $R_3'$. The dyestuffs of the Formula 4 may be asymmetrical, but they are preferably symmetrical. In the latter case, at least $$A\text{—}R_1\text{—}CH\text{=}Pz\text{—}R_3\text{—}$$

and $R_3{'}\text{—}Pz{'}\text{=}HC\text{—}R_1{'}\text{—}A'$ have the same constitution.

The following are examples of bridge members represented by —X—: ethylene bridges, for example, $$\text{—}CH\text{=}CH\text{—}$$

simple or extended urea bridges, for example $$\text{—}NH\text{—}CO\text{—}HN\text{—}$$

or

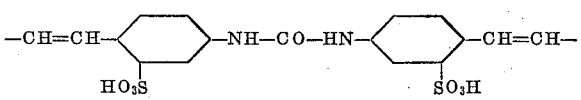

or

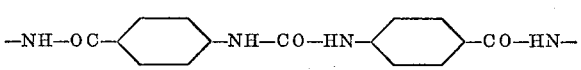

dicarboxylic acid diamide radicals, for example,

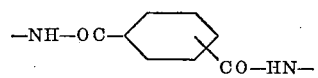

or

—NH—OC—CH=CH—CH=CH—CO—HN—

1:3:5-triazine radicals, for example

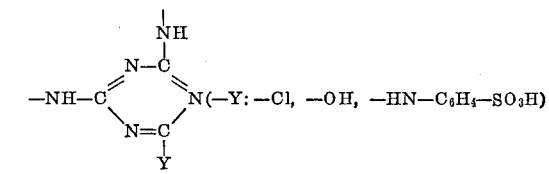

pyrimidine radicals, for example,

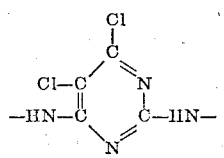

Position 3 in the pyrazolone nuclei present in the dyestuffs of Formulae 1 and 4 may be occupied, for example, by carboxylic acid groups, carboxylic acid amide groups which may be further substituted at the nitrogen atom, phenyl groups or preferably methyl groups.

Dyestuffs of the Formulae 1 and 3 can be prepared by known methods, for example, by condensing an acylamino-benzaldehyde in a molecular ratio of $n:1$ with a 5-pyrazolone containing $n$ pyrazolone rings and containing an aromatic ring in 1-position, at least one of the starting materials containing at least one sulfonic acid group and $n=1$ or 2.

Some of the dyestuffs of the Formula 4 can also be prepared by reacting in a molecular ratio of 1:1:1 two monostyryl dyestuffs of the formula (4a)         A—R$_1$—CH=Pz—R$_3$—Z and (4b)         Z—R$_3'$—Pz'=CH—R$_1'$—A' in which A, A', R$_1$, R', Pz, Pz', R$_3$ and R$_3'$ have the meanings given above and Z represents a reactive substituent with a third compound containing at least two reactive substituents or by reacting a monostyryl dyestuff of the Formula 4a with a compound of the kind defined in a molecular ratio of 2:1. As examples there may be mentioned the reaction between 1 mol each of a dyestuff of Formulae 4a and 4b, in which Z represents an H$_2$N group, and 1 mol of cyanuric chloride and the linkage of 2 molecules of such a dyestuff by means of phosgene to form the urea derivative.

A number of the pyrazolones needed in the preparation of the styryl dyestuffs are known, and, in general, they can be made by known methods, advantageously by condensing benzoyl or acetoacetic acid esters with mono- or di-hydrazinoaryl compounds obtained from aromatic diazo or tetrazo compounds.

The dyestuffs of the formulae indicated are very suitable for use in the preparation of filter layers. For this purpose they can be used in the usual manner. It is known that colloidal silver can be used as a yellow filter in filter layers. Although it has a very favorable absoprtion spectrum it also has various disadvantages, for example, bad reproducibility in respect of constant properties, inadequate stability and fogging in the adjacent emulsion layers. The dyestuffs of the present invention are, in general, as good as or even superior to colloidal silver in respect of color absorption spectrum and do not have the disadvantages indicated above. The dyestuffs also possess other properties that are nowadays required of filter dyestuffs. For example, they are non-diffusing and, at the same time, are easily and irreversibly bleachable by the usual treatment baths, especially alkaline baths containing sulfite. The properties are not impaired by the substances present in the adjacent layers or by the processes used in their manufacture. For example, the dyestuffs can be used as filters in multilayer material for the silver dyestuff bleaching process which material contains, on a layer support, a red-sensitized silver halide emulsion layer containing a cyan image dyesutff, a green-sensitized silver halide emulsion layer containing a magenta dyestuff, a filter layer containing a dyestuff of the Formula 1 and a silver halide layer containing a yellow image dyestuff.

In particular, these dyestuffs have been found to be valuable in the color development process; for example, they can be incorporated in a light-sensitive photographic material that contains at least one layer containing a color coupler. Material of the kind defined advantageously contains, on a layer support, a red-sensitized silver halide emulsion layer containing a cyan coupler, a green-sensitized silver halide emulsion layer containing a magenta coupler, a filter layer containing a dyestuff of the Formula 1 and silver halide emulsion layer containing a yellow coupler.

The fact that they can be easily and completely bleached without any effect on the adjacent emulsion layers is advantageous in respect of all kinds of color material, especially in respect of color negative and color reversal films. It is very surprising that it is at all possible to achieve useful results by means of the dyestuffs of the Formula 1 in filter layers to be used in the color development process, because it is probable that pyrazolones are again formed from the styryl dyestuffs when decomposition takes place and, since pyrazolones have the properties of color couplers, it is natural to expect fogging to occur.

The following manufacturing processes and Examples illustrate the invention. Unless otherwise stated, the parts and percentages are by weight.

Manufacturing processes (A) 101.3 parts of the dipyrazolonedisulfonic acid of the formula (5)

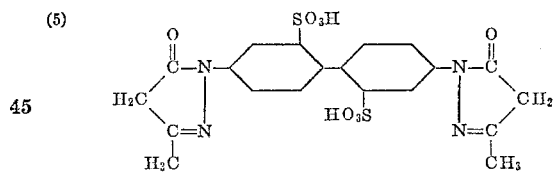

and 1,500 parts by volume of methanol are heated to boiling temperature in a reaction vessel provided with a reflux condenser, thermometer and stirring means. The batch is neutralized with an aqueous 30% sodium hydroxide solution, 78.5 parts of para-acetylaminobenzaldehyde and a further 100 parts by volume of methanol (for rinsing) are added and the whole is stirred for 2 hours at the boil. 200 parts by volume of 37% hydrochloric acid free from iron are then added to the hot solution, the precipitated product is isolated by suction filtration at about 60° C., washed with methanol until the absorption spectrum of the aqueous solution of the dyestuff ceases to change and then dried in vacuo at 70° C. About 127 grams of an orange powder are obtained whose aqueous solution shows a pH value of 6.5 and an absorption maximum at 440 m$\mu$.

This dyestuff, which corresponds to the formula (6)

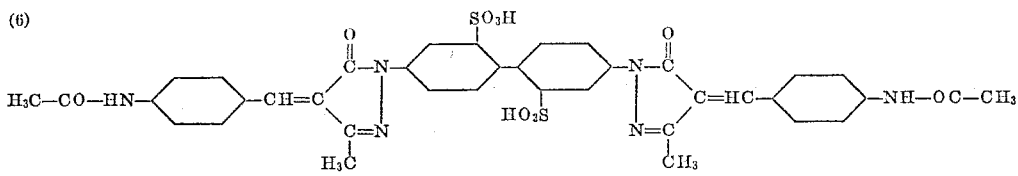

is suitable for use in anti-halation and filter layers, especially in material used in the color developing process.

(B) A dyestuff also suitable for these purposes the aqueous solution of which shows a pH value of 6.5 and an absorption maximum at 445 mμ and corresponding to the formula (7) 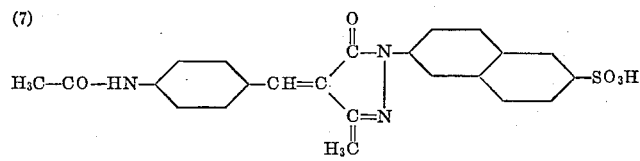

is obtained by condensing 1-naphthyl-(2')-3-methyl-5-pyrazolone-6'-sulfonic acid and para-acetylaminobenzaldehyde in a molecular ratio of 1:1 by the process indicated above.

(C) Styryl dyestuffs of the formulae hereinafter indicated which can be used as filter dyestuffs can be prepared by the method described under A.

(8) 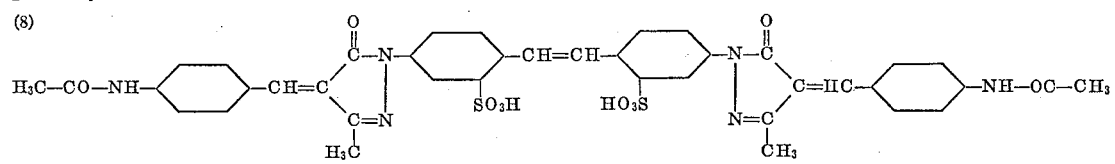

(9) 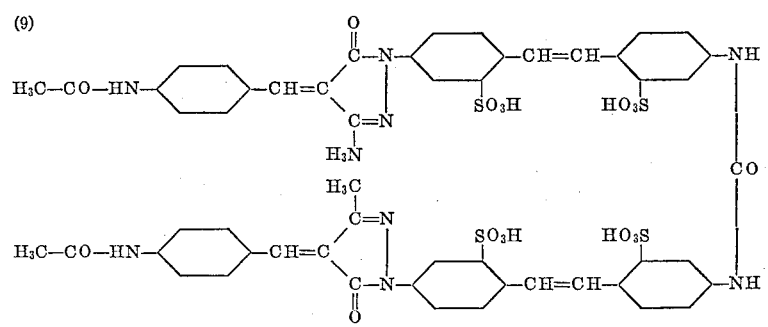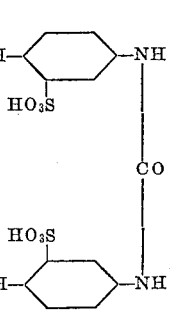

(10) 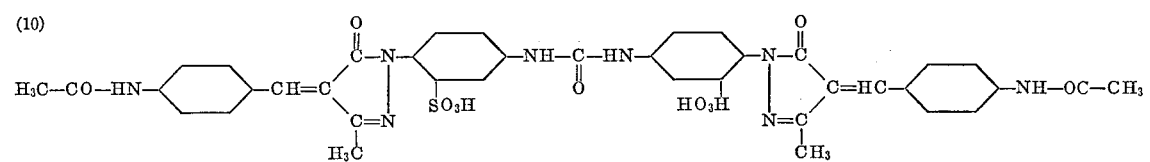

(11) 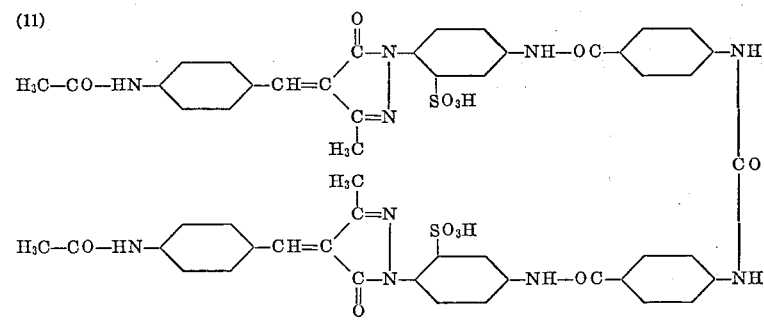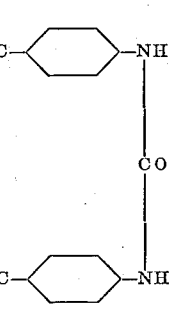

(12) 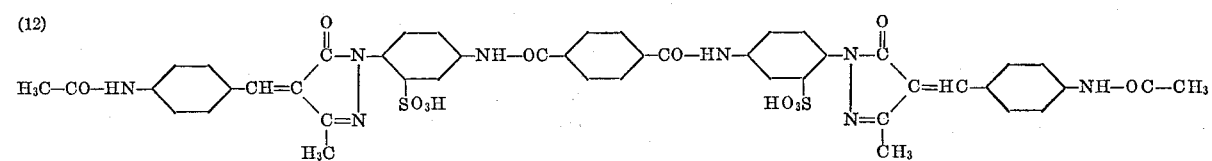

(13) 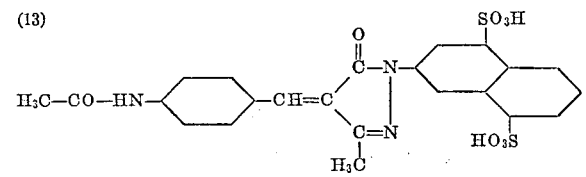

(14) 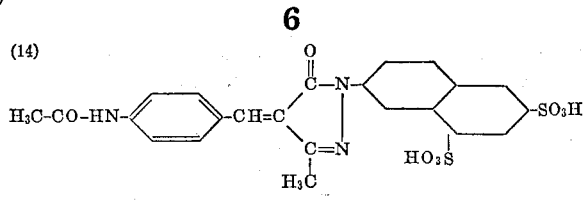

(15) 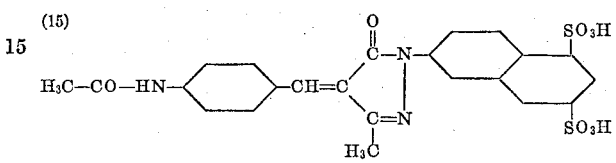

(16) 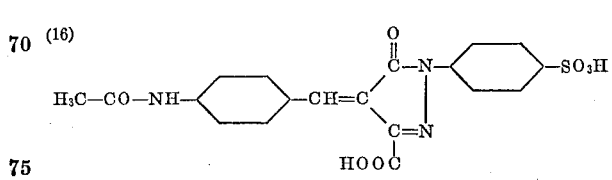

(D) 500 parts by volume of methanol, 50 parts by volume of water, 44 parts of pyrazolone sulfonic acid of the formula

(17)
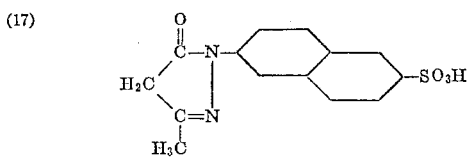

and a solution of 25 parts of para-benzoylaminobenzaldehyde, 500 parts by volume of methanol and 5 parts by volume of chlorosulfonic acid are introduced into a reaction vessel provided with reflux condenser, thermometer and stirring means. The batch is stirred for 24 hours at boiling temperature, rendered acid to congo paper with 10% hydrochloric acid, stirred for a further 24 hours at boiling cooled to room temperature. Unreacted para-toluenesulfonic acid chloride is filtered off, the batch rendered acid to congo paper with 10% hydrochloric acid, the precipitate isolated by filtration, washed with 0.1 N hydrochloric acid and then with water and then dried in vacuo at 80° C. About 22 parts of a yellow powder are (F) The styryl dyestuff of the following formula can also be prepared by manufacturing process D. obtained.

Purification is effected by suspending the crude product in 500 parts by volume of water at a pH value of 9.0, filtering the suspension and precipitating the para-toluenesulfonylaminobenzaldehyde from the filtrate with 10% hydrochloric acid. About 6 parts of a pale yellow powder melting at 190° C. to 191° C. are obtained.

*Analysis.*—Calculated: C, 61.07%; H, 4.76%; S, 11.65%. Found: C, 61.17%; H, 5.05%; S, 11.45%.

(20)
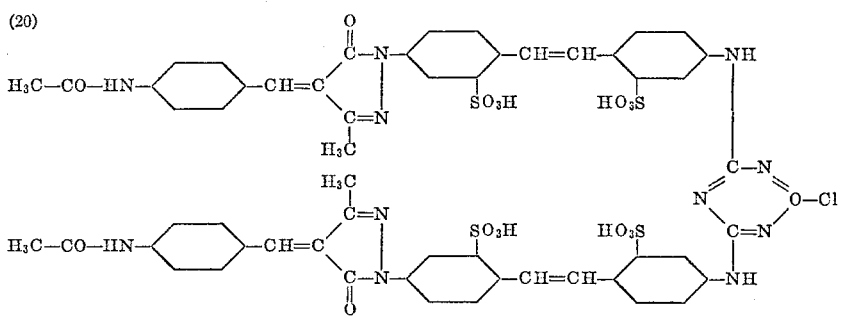

temperature, rendered acid to Congo paper with 10% at about 60° C., washed with methanol until the filtrate is colorless and then dried in vacuo at 60° C.

About 30 parts of the dyestuff of the formula

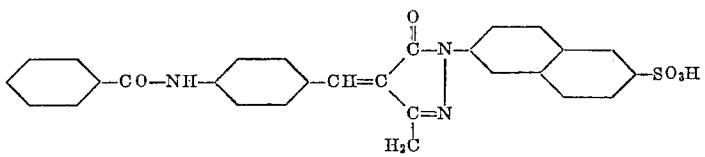

are obtained which in aqueous solution shows a pH value of 6.5 and an absorption maximum at 445 mμ.

(E) The styryl dyestuff of the following formula is prepared by manufacturing process D:

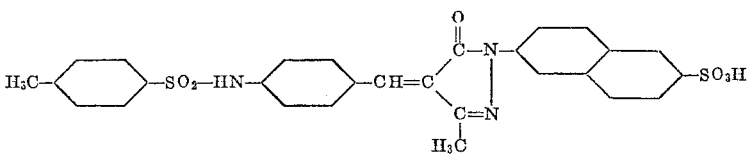

The para-toluenesulfonylaminobenzaldehyde required for this dyestuff is prepared in the following manner:

30 parts of para-aminobenaldehyde hydrochloride are dissolved in an open reaction vessel in a boiling mixture comprising 6,000 parts by volume of water and 250 parts by volume of 10% hydrochloric acid while stirring. The pH of the solution is adjusted to 7.5 with 100 parts of sodium borate and the requisite amount of 30% sodium hydroxide solution. 120 parts of para-toluenesulfonic acid chloride are immediately added and the batch boiled for 10 minutes, the pH being maintained at 7.5 to 8.0 by the dropwise addition of sodium hydroxide solution.

Stirring is continued until the reaction mixture has

EXAMPLE 1

A multi-layer color reversal film is prepared as follows:

The layers are cast in the sequence indicated on a cellulose triacetate photographic support layer having an anti-halation layer containing 2 grams of gelatine and 0.33 gram of a black colloidal silver dispersion per square meter:

(1) A red-sensitized gelatine-silver iodobromide emulsion comprising 6 mol percent of silver iodide and 94 mol percent of silver bromide and having a silver content of 1.60 grams per square meter, and that contains 250 grams of gelatine and 92.5 grams of the non-diffusing cyan coupler of the formula

(21)
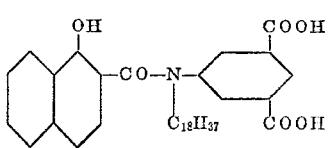

per mol of silver halide, and the usual additives, that is to say, stabilizers, wetting agents and hardeners.

(2) A green-sensitized gelatine-silver iodobromide emulsion comprising 6 mol percent of silver iodide and 94 mol percent of silver bromide and having a silver content of 0.91 gram per square meter, and that contains 250 grams of gelatine and 78 grams of the non-diffusing magenta coupler of the formula

(22)
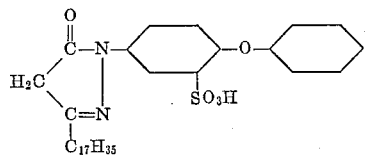

per mol of silver halide, and the usual additives, that is to say, stabilizers, wetting agents, and hardeners.

(3) A yellow filter layer to absorb blue light, which layer contains about 2 grams of gelatine, 0.77 gram of the dyestuff of the Formula 6 or 7 per square meter and the usual additives such as wetting agents and hardeners.

(4) An unsensitized gelatine-silver iodobromide emulsion comprising 3 mol percent of silver iodide and 97 mol percent of silver bromide and having a silver content of 1.20 grams per square meter and that contains 250 grams of gelatine and 84 grams of the non-diffusing yellow coupler of the formula

(23)
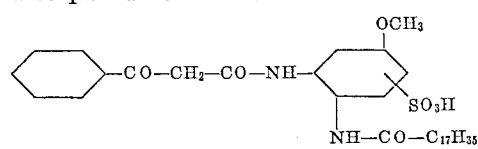

per mol of silver halide, and the usual additives, that is to say, stabilizers, wetting agents and hardeners.

(5) A protective gelatine layer containing about 1 gram of gelatine per square meter and the usual wetting and hardening agents.

After exposure, a color diapositive can be prepared in the usual manner by development with a 1-methyl-amino-4-hydroxybenzene-hydroquinone developed silver halide, color development in a para-amino-dimethyl-aminobenzene developer, bleaching and fixation.

The same yellow filter layer can also be used in multi-layer color negative films and color papers. Furthermore, the dyestuffs of the Formulae 8 to 16 and 18, 19 and 20 can also be used instead of those of the Formulae 6 and 7.

EXAMPLE 2

Multi-layer color material for the silver dyestuff bleaching process is prepared as follows: The layers are cast in the sequence indicated on a white-pigmented cellulose acetate film provided with an adhesive layer:

(1) A red-sensitized silver bromide emulsion in gelatine containing the cyan dyestuff of the formula

(24)
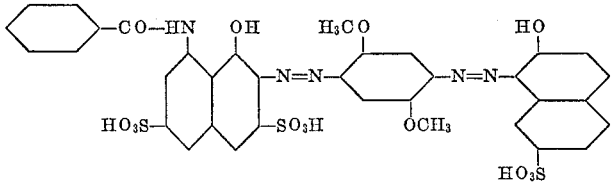

and the usual additives, that is to say, stabilizers, wetting agents and hardeners.

(2) An intermediate gelatine layer containing a hardener.

(3) A green-sensitized silver bromide emulsion in gelatine containing the magneta dyestuff of the formula

(25)
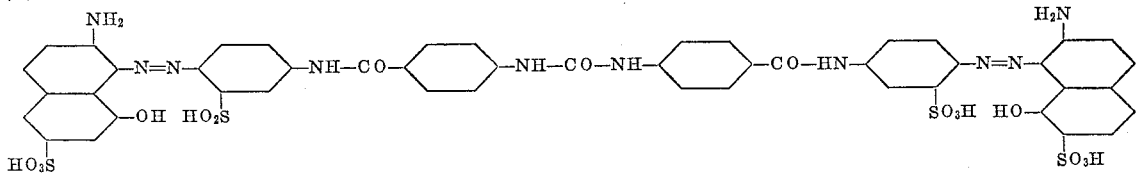

and the usual additives, that is to say, stabilizer, wetting agents and hardeners.

(4) A yellow filter layer to absorb blue light containing the dyestuff of the Formula 6 or 7 and the usual additives, that is to say, wetting and hardening agents.

(5) A blue-sensitized silver bromide emulsion in gelatine containing the yellow dyestuff of the formula

(26)
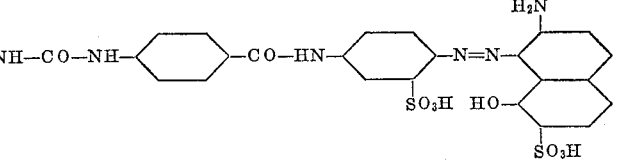

and the usual additives, that is to say, stabilizers, wetting agents and hardeners.

(6) A protective gelatine layer containing a hardener.

The material is exposed, developed with a 1-methyl-amino-4-hydroxybenzene-hydroquinone developer, fixed, bleached in a color bleaching bath containing hydrochloric acid, potassium bromide, thiourea and 2-amino-3-hydroxyphenazine and then freed from excess silver. An image corresponding to the original is obtained.

When, after development, the developed silver is removed, the residual silver bromide reduced, the material bleached in a color bleaching bath of the composition indicated above, and freed from excess silver, an image complementary to the original is obtained.

What is claimed is:

1. Photographic silver halide light-sensitive material containing a styryl dyestuff which contains at least one sulfonic acid group and corresponds to the formula $$A-R_1-CH=Py$$

in which A represents an acylamino group bound to $R_1$ through its nitrogen atom, $R_1$ represents a benzene radical, and Py represents the radical of a 5-pyrazolone bound to the —CH= group in 4-position and to an aromatic ring in 1-position said sulfonic acid group(s) being present in the aromatic radical bound to the pyrazolone ring.

2. Photographic silver halide light-sensitive material containing a styryl dyestuff which contains at least one sulfonic acid group and corresponds to the formula $$(A-R_1-CH=Pz)_nR_2,$$

in which A represents an acylamino group bound to $R_1$ through its nitrogen atom, $R_1$ represents a benzene radical, Pz represents the radical of a 5-pyrazolone bound to the —CH= group in 4-position and to $R_2$ in 1-position, $R_2$ represents an aromatic radical, and $n$ represents a whole number of at the most 2 said sulfonic bound to the pyrazolone ring.

3. Photographic silver halide light-sensitive material containing a styryl dyestuff which corresponds to the formula $$A-R_1-CH=Pz-R_3-X-R_3-Pz=HC-R_1-A$$

in which A represents an acylamino group bound to $R_1$ through its nitrogen atom, $R_1$ represents a benzene radical, Pz represents the radical of a 5-pyrazolone bound to the —CH= group in 4-position and to $R_3$ in 1-position, $R_3$ represents an aromatic radical containing at least one sulfonic acid group and X represents a member selected from the group consisting of a direct link and a bridge member selected from the group consisting of an ethylene bridge, a simple urea bridge, an extended urea bridge, a dicarboxylic acid diamide group and a 1:3:5-triazine group.

4. Photographic silver halide light-sensitive material containing a styryl dyestuff which corresponds to the formula

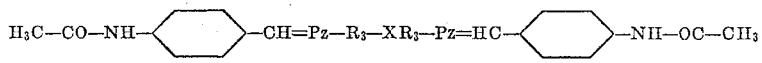

in which Pz represents the radical of a 5-pyrazolone bound to the —CH= group in 4-position and to $R_3$ in 1-position, $R_3$ represents an aromatic radical containing at least one sulfonic acid group and X represents a member selected from the group consisting of a direct link and a bridge member selected from the group consisting of an ethylene bridge, a simple urea bridge, an extended urea bridge, a dicarboxylic acid diamide group and a 1:3:5-triazine group.

5. Photographic silver halide light-sensitive material containing a styryl dyestuff which corresponds to the formula

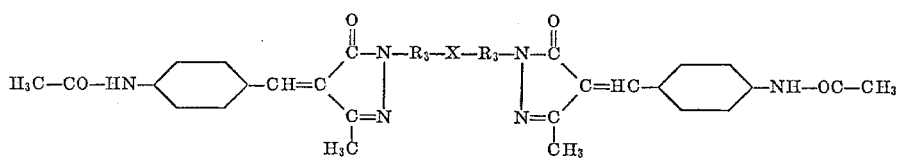

in which $R_3$ represents an aromatic radical containing at least one sulfonic acid group bound to a benzene ring and X represents a member selected from the group consisting of a direct link and a bridge member selected from the group consisting of an ethylene bridge, a simple urea bridge, an extended urea bridge, a dicarboxylic acid diamide group and a 1:3:5-triazine group.

6. Photographic silver halide light-sensitive material containing the styryl dyestuff of the formula

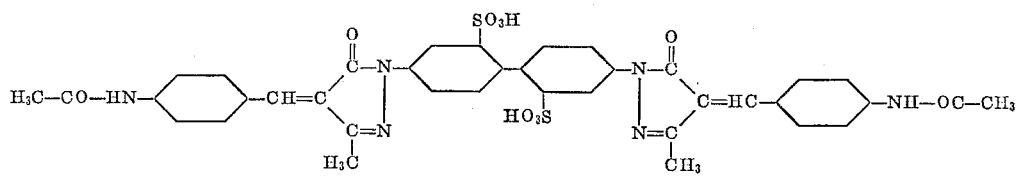

7. Photographic silver halide light-sensitive material containing the styryl dyestuff of the formula

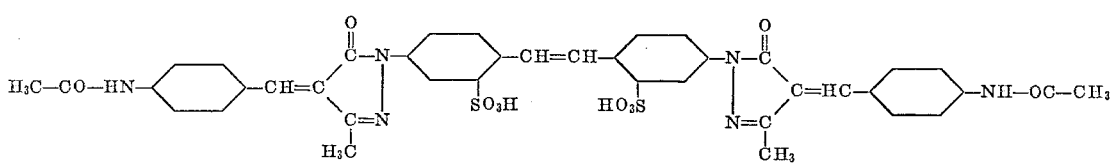

8. Photographic silver halide light-sensitive material containing the styryl dyestuff of the formula

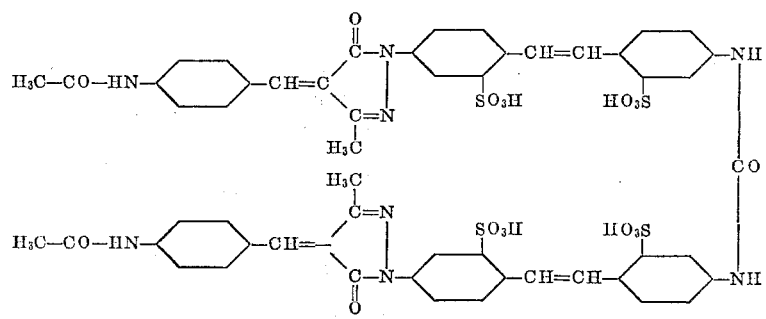

dicarboxylic acid diamide group and a 1:3:5-triazine group.

(References on following page)

References Cited

UNITED STATES PATENTS

| | | | |
|---|---|---|---|
| 2,186,731 | 1/1940 | Schneider | 96—84 |
| 3,178,291 | 4/1965 | Mory et al. | 96—84 |
| 3,316,091 | 4/1967 | Rossi et al. | 96—84 |

FOREIGN PATENTS

| | | |
|---|---|---|
| 596,917 | 8/1959 | Italy. |
| 1,350,311 | 12/1963 | France. |

NORMAN G. TORCHIN, *Primary Examiner.*

R. H. SMITH, *Assistant Examiner.*

UNITED STATES PATENT OFFICE
CERTIFICATE OF CORRECTION

Patent No. 3,389,994                        June 25, 1968

Bernhard Piller

It is certified that error appears in the above identified patent and that said Letters Patent are hereby corrected as shown below:

Column 11, line 18, before "bound" insert -- acid group(s) being present in the aromatic radical --.

Signed and sealed this 30th day of December 1969.

(SEAL)
Attest:

Edward M. Fletcher, Jr.                      WILLIAM E. SCHUYLER, JR.

Attesting Officer                              Commissioner of Patents